(12) United States Patent
Vasagar

(10) Patent No.: US 10,941,780 B2
(45) Date of Patent: *Mar. 9, 2021

(54) SLURRY SEAL ASSEMBLY

(71) Applicant: Stein Seal Company, Kulpsville, PA (US)

(72) Inventor: Thurai Manik Vasagar, Hatfield, PA (US)

(73) Assignee: Stein Seal Company, Kulpsville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/865,508

(22) Filed: May 4, 2020

(65) Prior Publication Data

US 2020/0263693 A1 Aug. 20, 2020

Related U.S. Application Data

(63) Continuation of application No. 15/765,565, filed as application No. PCT/US2016/012404 on Jan. 7, 2016, now Pat. No. 10,677,247.

(51) Int. Cl.
F16J 15/00 (2006.01)
F04D 7/04 (2006.01)
(Continued)

(52) U.S. Cl.
CPC ............. *F04D 7/04* (2013.01); *F04D 29/106* (2013.01); *F04D 29/122* (2013.01);
(Continued)

(58) Field of Classification Search
CPC ........ F04D 1/06; F04D 29/046; F04D 29/049; F04D 29/106; F04D 29/2266;
(Continued)

(56) References Cited

U.S. PATENT DOCUMENTS

2006/0257245 A1 11/2006 Smith et al.
2008/0008577 A1 1/2008 Cohen
(Continued)

FOREIGN PATENT DOCUMENTS

| | | |
|---|---|---|
| CN | 204140367 U | 2/2015 |
| JP | 2006329362 A | 12/2006 |
| WO | 2010105294 A1 | 9/2010 |

OTHER PUBLICATIONS

Jae Woo Park, International Preliminary Report on Patentability, dated Jan. 8, 2018, issued by Korean Intellectual Property Office (14 pages).

(Continued)

*Primary Examiner* — J. Todd Newton
*Assistant Examiner* — Andrew J Marien
(74) *Attorney, Agent, or Firm* — Michael Crilly, Esquire

(57) ABSTRACT

A slurry seal assembly for use about a rotatable shaft between a process side and an atmosphere side is presented. The slurry seal assembly includes a sleeve, a rotatable seal ring, a stationary seal ring, a floating bushing seal assembly, and a plurality of slots. The sleeve is disposed about and rotatable with the shaft. The rotatable seal ring contacts and is rotatable with the sleeve. The stationary seal ring is arranged to form a sealing interface with the rotatable seal ring. The floating bushing seal assembly is disposed about (Continued)

the sleeve so that an inner annular surface along the floating bushing seal assembly is separated from an outer annular surface along the sleeve by a gap. The slots are disposed along the sleeve within the process side adjacent to the floating bushing seal assembly. The slurry seal assembly is applicable to devices whereby a fluid is movable between an inlet and an outlet.

37 Claims, 7 Drawing Sheets

(51) Int. Cl.
  *F04D 29/12* (2006.01)
  *F16J 15/34* (2006.01)
  *F04D 29/10* (2006.01)
  *F04D 29/42* (2006.01)

(52) U.S. Cl.
  CPC ............ *F04D 29/126* (2013.01); *F16J 15/00* (2013.01); *F16J 15/3404* (2013.01); *F04D 29/426* (2013.01)

(58) Field of Classification Search
  CPC .... F04D 29/448; F04D 29/628; F04D 29/086; F04D 29/0413; F04D 13/10; F04D 29/0473; F04D 7/00; F04D 7/02; F04D 7/04; F04D 7/045; F04D 29/08; F04D 29/10; F05D 2240/55; F16J 15/3284
  See application file for complete search history.

(56) References Cited

U.S. PATENT DOCUMENTS

2011/0250056 A1  10/2011  Munson
2012/0261887 A1  10/2012  Vasagar

OTHER PUBLICATIONS

Jin Ho Kim, International Search Report and Written Opinion, dated Oct. 4, 2016, issued by Korean Intellectual Property Office (17 pages).
Reply to Written Opinion with Amendments under Article 34, dated Nov. 15, 2016, filed with Korean Intellectual Property Office (11 pages).
Arun Sharma, Examination Report No. 1 for Standard Patent Application, issued by IP Australia (2 pages).
David De Tobel, European Search Report and Opinion, dated Mar. 15, 2019, issued by European Patent Office (11 pages).
Reply to Opinion, dated Oct. 8, 2019, filed with European Patent Office (7 pages).
Dinesh Nath Goswami, Examination Report and Opinion, dated Nov. 13, 2019, issued by Intellectual Property India (7 pages).
Reply to Opinion, dated Apr. 22, 2020, filed with Intellectual Property India (18 pages).

SLURRY SEAL ASSEMBLY

CROSS REFERENCE TO RELATED APPLICATIONS

This application is a continuation of U.S. patent application Ser. No. 15/765,565 filed Apr. 3, 2018 which is a National Phase of PCT Application No. PCT/US2016/012404 filed Jan. 7, 2016 both entitled Slurry Seal Assembly which are incorporated in their entirety herein by reference thereto.

FEDERALLY SPONSORED RESEARCH AND DEVELOPMENT

None.

BACKGROUND OF THE INVENTION

1. Field of the Invention

The invention generally relates to a seal assembly that prevents a slurry from contacting a pair of face seal rings and more particularly is concerned, for example, with a first face seal ring disposed along a sleeve that rotates and translates with a shaft, a second face seal ring along with a retainer arm disposed in a housing so as to be non-rotatable yet translatable, a floating bushing seal assembly disposed about an outer circumferential surface of the sleeve adjacent to the face seal rings, and a plurality of slots along a front face of the sleeve whereby the slots and the floating bushing seal assembly cooperate to resist flow of the slurry in the direction of seal rings.

2. Background

A variety of pumps are employed to transport a fluid with or without abrasive constituents from an inlet end to an outlet end. Exemplary fluids generally include slurries for which specific examples further include, but are not limited to, petroleum, petrochemicals, pharmaceuticals, and ore/liquid mixtures.

In one example, a centrifugal pump converts rotational kinetic energy of a component within the pump to the hydrodynamic energy of a fluid. Specifically, an impeller is rotated by an engine, a turbine, an electric motor or the like. The impeller interacts with a fluid so as to draw the fluid into the pump at an inlet end, to accelerate the fluid as it traverses the pump, and to discharge the fluid at an outlet end.

A slurry pump is a specific example of a centrifugal pump. Slurry pumps are often employed in mining and ore processing operations.

Ootsuka et al. describes a slurry seal in U.S. Pat. No. 5,195,755 issued Mar. 23, 1993. As illustrated in FIG. 1, the seal includes a stationary seal ring 3 contacting a first packing 2 that further contacts a flange 1 along a pump casing and a rotary seal ring 8 contacting a second packing 7 that further contacts a sleeve cover 6 secured to a sleeve 5. The sleeve 5 is attached to the outer surface of a shaft 4. Each seal ring 3, 8 includes a sealing surface 3a, 8a, respectively, mutually arranged to form a seal that resists leakage of a slurry between a slurry side 18 and an atmosphere side 19.

It is well known within the art that the abrasive constituents within a slurry prematurely wear the sealing surfaces 3a, 8a. The end results are reduced seal performance, reduced seal life, leakage across the sealing surfaces 3a, 8a, and contamination outside of the slurry side 18. It is not uncommon for slurry seals to fail after only three months of ordinary use.

The related art attempts to prevent a slurry from reaching and contacting the seal rings 3, 8 via a fixed bushing seal assembly 10. FIGS. 2 and 3 separately illustrate a fixed bushing seal assembly 10 including a bushing arm 11 that extends from the flange 1 in the direction of the slurry side 18. A wear layer 12 as shown in FIG. 2 or a windback 15 as shown in FIG. 3 is fixed to and extends from the bushing arm 11 in the direction of the sleeve cover 6 and the sleeve 5. A radial gap 16 is provided between the wear layer 12 and sleeve cover 6 or the windback 15 and sleeve cover 6 so as to minimize wear to and heating of the elements. A fluid, typically water, is pumped into an intermediate chamber 17 after which the fluid is communicated to and across the gap 16 and into the slurry side 18. The velocity and pressure of the fluid traversing the gap 16 must be sufficient to prevent a slurry, originating in the slurry side 18, from reaching the seal rings 3, 8 by crossing the gap 16 in the direction opposite to that of the fluid flow.

It is well known within the art that the wear layer 12 or the windback 15 must be separated from the sleeve cover 6 by a large radial gap or clearance in order to accommodate thermal expansion of and vibrations by components within the seal assembly.

The design envelope of a gap within a fixed bushing seal assembly 10 is inherently problematic because the mass flow rate of a fluid required to properly resist the counter flow by a slurry increases correspondingly with gap size. Specifically, the quantity of fluid required for adequate sealing functionality across the gap within a fixed bushing seal assembly is unsustainable in remote or arid locations or impractical because it adversely alters the composition of the slurry within the slurry side.

In view of the mass flow considerations, it is often impossible to size a gap to properly accommodate the full range of thermal and vibration conditions within a pump. This means that contact between a fixed bushing seal assembly and a sleeve is inevitable. The rigid nature of a fixed bushing seal assembly increases the likelihood of significant damage to the seal assembly when contact occurs.

Furthermore, in view of the mass flow considerations, it is often impossible to consistently achieve the mass flow rate required to adequately counter the upstream flow of a slurry across a large gap.

Therefore, presently know sealing assemblies are deficient in that the paired arrangement of face seals is inadequate to prevent leakage of a slurry from a variety of pumps.

Therefore, presently know sealing assemblies are deficient in that fixed bushing seal assemblies impose mass flow rates which are often unsustainable, impractical, or impossible.

Therefore, presently know sealing assemblies are deficient in that fixed bushing seal assemblies are susceptible to heat-induced events and/or vibration-induced events that damage components required to prevent a slurry from reaching and contacting the primary sealing elements therein.

Accordingly, what is required is a seal assembly that avoids heat-induced and/or vibration-induced excursions that damage a seal assembly.

Accordingly, what is required is a seal assembly that better utilizes flow of a fluid to prevent a slurry from contacting the primary sealing elements therein.

Accordingly, what is required is a seal assembly that utilizes means to supplement or to enhance flow of a fluid to prevent a slurry from contacting the primary sealing elements therein.

SUMMARY OF THE INVENTION

An object of the invention is to provide a seal assembly that avoids heat-induced and/or vibration-induced excursions that damage a seal assembly.

An object of the invention is to provide a seal assembly that better utilizes flow of a fluid to prevent a slurry from contacting the primary sealing elements therein.

An object of the invention is to provide a seal assembly that utilizes means to supplement or to enhance flow of a fluid to prevent a slurry from contacting the primary sealing elements therein.

In accordance with embodiments of the invention, the slurry seal assembly includes a sleeve, a rotatable seal ring, a stationary seal ring, and a floating bushing seal assembly. The sleeve is disposed about, contacts, and is rotatable with the rotatable shaft. The rotatable seal ring contacts and is rotatable with the sleeve. The stationary seal ring is arranged to form a sealing interface with the rotatable seal ring. The floating bushing seal assembly includes a bushing arm, an inner ring, an outer ring, an annular space, and a gap. The outer ring is disposed about and contacts the inner ring. The annular space is disposed between the outer ring and the bushing arm. The floating bushing seal assembly is disposed about the sleeve with the gap disposed between the inner ring and the sleeve. The gap and the annular space permit radial translation of the inner ring and the outer ring within the floating bushing seal assembly between the sleeve and the bushing arm.

In accordance with other embodiments of the invention, a plurality of slots is disposed along a front face of the sleeve at the process side and adjacent to the floating bushing seal assembly. Each slot is disposed along both the front face of the sleeve and an outer annular surface of the sleeve. The plurality of slots are rotatable with the sleeve.

In accordance with other embodiments of the invention, the plurality of slots and the inner ring cooperate to resist flow of a slurry along the gap in direction of the rotatable seal ring and the stationary seal ring.

In accordance with other embodiments of the invention, the plurality of slots extends along the outer annular surface into the gap.

In accordance with other embodiments of the invention, a chamfer overlays the plurality of slots.

In accordance with other embodiments of the invention, a windage is disposed adjacent to the outer annular surface as the plurality of slots rotates. The windage intersects the gap.

In accordance with other embodiments of the invention, at least one of the plurality of slots interacts with the slurry to redirect the slurry away from the gap.

In accordance with other embodiments of the invention, at least one of the plurality of slots produces a windage to redirect the slurry away from the gap.

In accordance with other embodiments of the invention, at least one of the plurality of slots interacts with a fluid to redirect the slurry away from the gap.

In accordance with other embodiments of the invention, an anti-rotation pin extends from the outer ring and engages a slot along the bushing arm.

In accordance with other embodiments of the invention, a pump has the slurry seal assembly.

In accordance with other embodiments of the invention, a fluid traverses the gap in direction of the process side.

In accordance with other embodiments of the invention, the fluid prevents a slurry from traversing the gap in direction of the atmosphere side.

In accordance with embodiments of the invention, a method of sealing a process side from an atmosphere side within a pump includes the steps of rotating and communicating. A rotatable seal ring and a sleeve are rotated with respect to a stationary seal ring. The rotatable seal ring and the stationary seal ring define a sealing interface therebetween. The rotatable seal ring contacts the sleeve. A fluid is communicated along a gap between an inner ring of a floating bushing seal assembly and the sleeve. An outer ring of the floating bushing seal assembly is disposed about and contacts the inner ring. An annular space is disposed between the outer ring and a bushing arm of the floating bushing seal assembly. The gap and the annular space permit radial movement of the inner ring and the outer ring between the sleeve and the bushing arm.

In accordance with other embodiments of the invention, a plurality of slots is disposed along a front face of and rotatable with the sleeve within the process side. The sleeve is disposed about and contacts a rotatable shaft. Each slot is disposed along both the front face of the sleeve and an outer annular surface of the sleeve. The inner ring and the gap are disposed about the outer annular surface of the sleeve.

In accordance with other embodiments of the invention, the plurality of slots and the floating bushing seal assembly cooperate to resist flow of a slurry in the direction of the rotatable seal ring and the stationary seal ring.

In accordance with other embodiments of the invention, communicating and rotating steps prevent a slurry originating from the process side from traversing the gap toward the atmosphere side.

In accordance with other embodiments of the invention, communicating and rotating steps cause the fluid and the plurality of slots to interact so as to redirect a slurry away from the gap.

In accordance with other embodiments of the invention, communicating and rotating steps cause the plurality of slots to physically contact a slurry so as to redirect the slurry away from the gap.

In accordance with other embodiments of the invention, the rotating step causes a windage about the plurality of slots which redirects a slurry away from the gap.

In accordance with other embodiments of the invention, communicating and rotating steps cause the fluid to be redirected after the fluid enters the process side.

In accordance with other embodiments of the invention, the fluid interacts with a slurry so as to redirect the fluid away from the gap.

In accordance with other embodiments of the invention, the rotating step causes the plurality of slots to physically interact with and disperse a slurry.

In accordance with other embodiments of the invention, communicating and rotating steps accelerate the fluid via the plurality of slots after the fluid enters the process side.

In accordance with other embodiments of the invention, communicating and rotating steps accelerate the fluid via the plurality of slots as the fluid traverses the gap.

In accordance with other embodiments of the invention, communicating and rotating steps disperse the fluid via the plurality of slots after the fluid enters the process side.

In accordance with other embodiments of the invention, at least one of the plurality of slots interacts with the fluid to redirect a slurry away from the gap.

In accordance with other embodiments of the invention, at least one of the plurality of slots physically contacts a slurry to redirect the slurry away from the gap.

In accordance with other embodiments of the invention, at least one of the plurality of slots produces a windage to redirect a slurry away from the gap.

In accordance with other embodiments of the invention, the fluid is redirected via at least one of the plurality of slots after the fluid enters the process side.

In accordance with other embodiments of the invention, the fluid interacts with a slurry to redirect the slurry away from the gap.

In accordance with other embodiments of the invention, at least one of the plurality of slots physically interacts with and disperses a slurry.

In accordance with other embodiments of the invention, the fluid is accelerated via at least one of the plurality of slots after the fluid enters the process side.

In accordance with other embodiments of the invention, the fluid is accelerated via at least one of the plurality of slots as the fluid traverses the gap.

In accordance with other embodiments of the invention, the fluid is dispersed via at least one of the plurality of slots after the fluid enters the process side.

In accordance with other embodiments of the invention, the fluid prevents a slurry originating from the process side from traversing the gap toward the atmosphere side.

In accordance with other embodiments of the invention, a slurry is redirected away from the gap.

Several exemplary advantages are notable. The invention facilitates a smaller, more controllable gap thereby reducing the mass flow rate and the total quantity of water required to prevent a slurry from entering and traversing a gap between a floating bushing seal assembly and a sleeve in the direction of an atmosphere side. The invention facilitates a smaller gap between a floating bushing seal assembly and a sleeve enabling a higher flow velocity by a fluid along the gap thereby improving resistance to the upstream flow by a slurry. The invention includes slots rotatable within the process side that resist upstream flow of a slurry by physically interacting with the slurry so that the slurry is slung away from a gap between a floating bushing seal assembly and a sleeve, by generating windage that blocks passage of the slurry into the gap, by physically separating the slurry into smaller masses so that the slurry is more easily pushed away from and out of the gap, and/or by enhancing the flow and/or dispersal of the fluid traversing the gap. The invention avoids slurry-induced damage to the sealing components that directly contact the rotatable seal ring, stationary seal ring, and retainer arm. The invention is adaptable to cartridge and retrofit forms compatible with conventional pump designs. The invention improves seal performance and increases seal life.

The above and other objectives, features, and advantages of the preferred embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Figure 1:
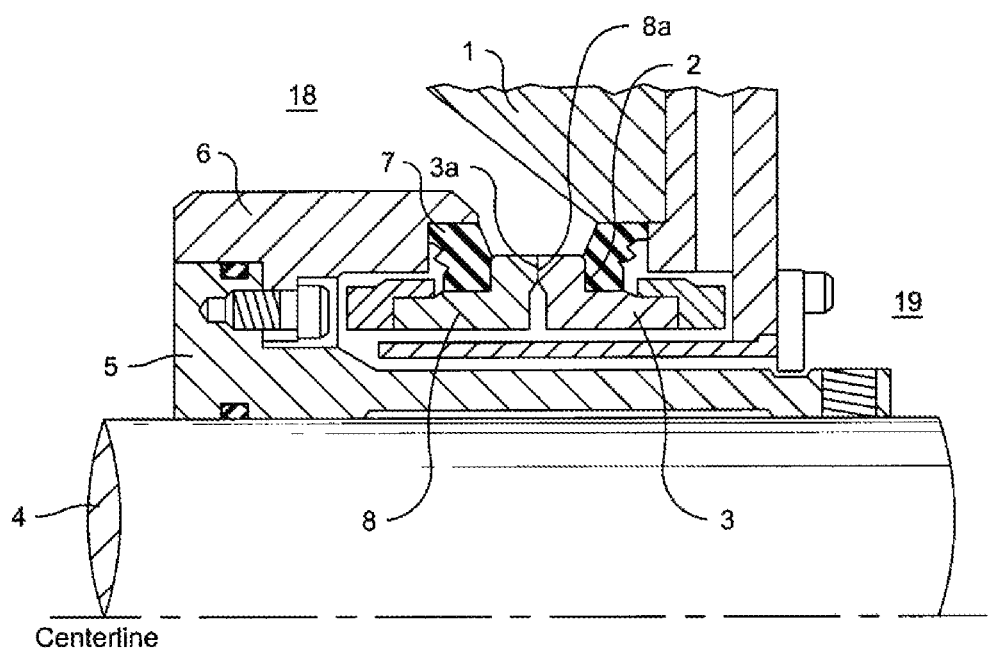
FIG. 1 is a partial cross section view illustrating a slurry seal including a rotatable face seal and a stationary face seal disposed about a rotatable shaft (seal and shaft components below centerline not shown) and arranged to provide a seal between a slurry side and an atmosphere side as described by Ootsuka et al. in U.S. Pat. No. 5,195,755.
Figure 2:
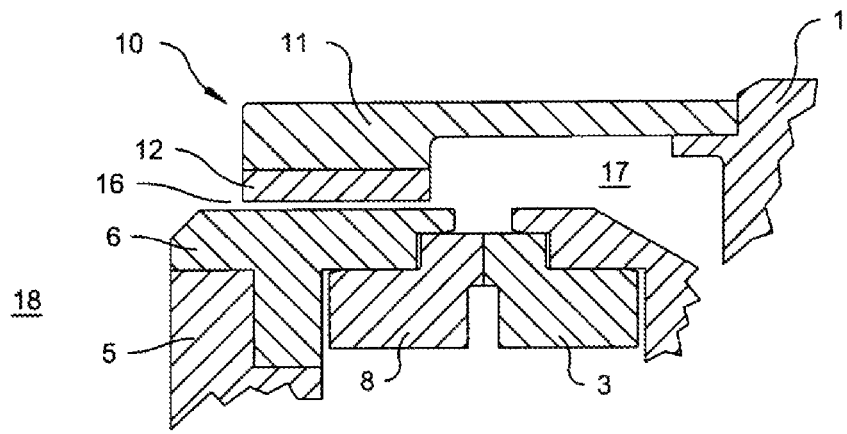
FIG. 2 is an enlarged cross section view illustrating a conventional fixed bushing seal assembly at one end of a slurry seal wherein the bushing includes a wear layer adjacent to a sleeve cover.
Figure 3:
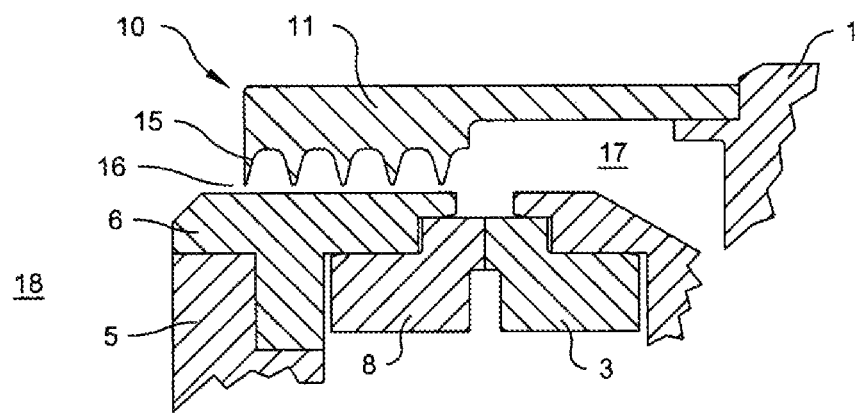
FIG. 3 is an enlarged cross section view illustrating a conventional fixed bushing seal assembly at one end of a slurry seal wherein the bushing includes a windback adjacent to a sleeve cover.

Reference will now be made in detail to several embodiments of the invention illustrated in the accompanying drawings. Wherever possible, same or similar reference numerals are used in the drawings and the description to refer to the same or like parts. The drawings are in simplified form and are not to precise scale.

While features of various embodiments are separately described, it is understood that two or more such features could be combined to form other embodiments.

In addition to the materials described and/or referenced herein, components comprising the seal assembly may be composed of other materials understood in the art and suitable to the application.

For purpose of the present application, the term "slurry" is understood to include liquids with or without particulates capable of prematurely wearing the sealing interface between a pair of face seals. Exemplary slurries include, but are not limited to, liquids with particulates and liquids without particulates wherein the liquids may be corrosive or otherwise capable of compromising a sealing interface.

Figure 4:
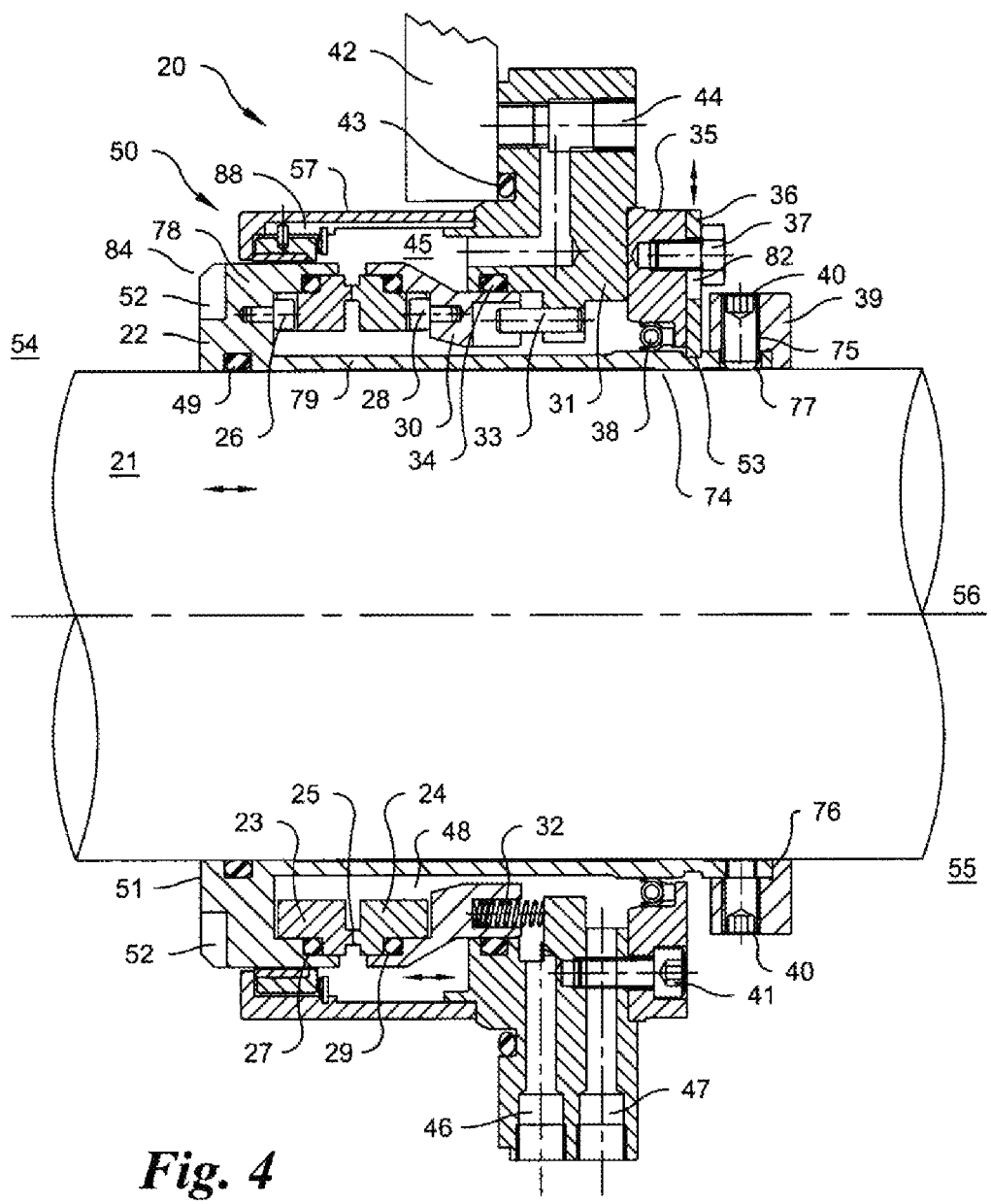
FIG. 4 is a partial cross section view illustrating a slurry seal disposed about a rotatable shaft and including a pair of face seal rings arranged to form a sealing interface, a floating bushing seal assembly disposed at one end of the slurry seal, and a plurality of slots disposed along a sleeve face whereby the floating bushing seal assembly and the slots cooperate to avoid a slurry from contacting the face seal rings in accordance with an embodiment of the invention.

Referring now to FIG. 4, a slurry seal assembly 20 is shown disposed about a rotatable shaft 21 between a process side 54 and an atmosphere side 55. The shaft 21 is a cylindrical structure attached to a means (not shown) that enables the shaft 21 to rotate about a rotation axis 56 passing through the lengthwise axis of the shaft 21. Rotation may be either clockwise or counter clockwise as required and suitable for the application. The shaft 21 may be attached to or communicable with a motor or other drive means (not shown) at the atmosphere side 55. The shaft 21 also may be attached to a component facilitating transport of a slurry between input and output ends at the process side 54. In one example, the slurry seal assembly 20 could be disposed along a shaft 21 within a slurry pump whereby the shaft 21 is attached at the atmosphere side 55 to an electric or gas-powered motor internal or external to the pump and at the process side 54 to an impeller.

Referring again to FIG. 4, a sleeve 22 includes a radial extension 78 and a cylindrical section 79 arranged to form a generally L-shaped cross section adjacent to a shaft 21. The sleeve 22 is disposed about the shaft 21 so as to contact a portion of the outer surface of the shaft 21 defining an interface 74. In some embodiments, the inner diameter of the sleeve 22 and the outer diameter of the shaft 21 are dimensioned so that the sleeve 22 slidably engages the shaft 21. In other embodiments, the inner and outer diameters provide an interference fit requiring the sleeve 22 to be heated and/or the shaft 21 cooled for proper assembly. One or more O-rings 49 may be required along the interface 74 to prevent material within the process side 54 from traversing the interface 74 in the direction of the atmosphere side 55.

Referring again to FIG. 4, the sleeve 22 contacts a drive collar 39 disposed about the shaft 21 at the atmosphere side 55. The drive collar 39 is a ring-shaped element that slidably engages the outer diameter of the shaft 21. The drive collar 39 includes two or more set screws 40 separately disposed about and aligned radially with respect to the sleeve 22. Each set screw 40 resides within a threaded hole 75 that traverses the drive collar 39 perpendicular to the shaft 21. The set screw 40 is rotatable within the threaded hole 75 so that the end of the set screw 40 adjacent to the shaft 21 either engages the shaft 21 thereby securing the drive collar 39 to the shaft 21 or disengages the shaft 21 thereby releasing the drive collar 39 from the shaft 21. The drive collar 39 includes an annular notch 76 adjacent to the shaft 21 that permits the sleeve 22 to slide into and engage the drive collar 39 adjacent to the outer diameter of the shaft 21. A plurality of holes 77 along the sleeve 22 separately aligns with each threaded hole 75 so that the set screws 40 properly contact and engage the shaft 21 to secure both the drive collar 39 and sleeve 22 to the shaft 21. This arrangement allows the sleeve 22 to rotate with the shaft 21. The drive collar 39 is placed onto and secured to the shaft 21 and sleeve 22 after other components described herein are assembled onto the sleeve 22. Assembly of the sleeve 22 and related components may occur either before or after placement of the sleeve 22 onto the shaft 21.

Referring again to FIG. 4, a rotatable seal ring 23 encircles the sleeve 22 opposite of the shaft 21. The seal ring 23 rotates about the shaft 21. The seal ring 23 moves axially with the sleeve 22 during shaft 21 movement and radially during shaft 21 vibration. The rotatable seal ring 23 is composed of wear and temperature resistant material, examples including, but not limited to, ceramics such as silicon carbide and tungsten carbide. The rotatable seal ring 23 is positioned at the process side 54 so as to abut the radial extension 78. An O-ring 27 is provided between the rotatable seal ring 23 and the radial extension 78 to seal an inner chamber 48 from an outer chamber 45. The O-ring 27 may be a static sealing ring or the like. One or more anti-rotation pins 26 are secured to the radial extension 78 and separately extend into a like number of comparably dimensioned cavities along the rotatable seal ring 23. The anti-rotation pin(s) 26 ensure(s) that the rotatable seal ring 23 rotates with the sleeve 22 and shaft 21.

Referring again to FIG. 4, a stationary seal ring 24 also encircles the sleeve 22 opposite of the shaft 21. The seal ring 24 is stationary in that it does not rotate about the shaft 21; however, the seal ring 24 may translate axially with the retainer arm 30. The stationary seal ring 24 is also composed of wear and temperature resistant material, examples including, but not limited to, ceramics such as silicon carbide and tungsten carbide. The stationary seal ring 24 is positioned to abut the rotatable seal ring 23 along a sealing interface 25. The sealing interface 25 permits the rotatable seal ring 23 to rotate with respect to the stationary seal ring 24 while maintaining sealing contact between the seal rings 23, 24. The sealing interface 25 further seals an inner chamber 48 from an outer chamber 45. The stationary seal ring 24 abuts a ring-shaped retainer arm 30. An O-ring 29 is provided between the stationary seal ring 24 and the retainer arm 30 to seal the inner chamber 48 from the outer chamber 45. The O-ring 29 may be a static sealing ring or the like. One or more anti-rotation pins 28 are secured to the retainer arm 30 and separately extend into a like number of comparably dimensioned cavities along the stationary seal ring 24. The anti-rotation pin(s) 28 ensure(s) that the stationary seal ring 24 remains non-rotatably fixed to the retainer arm 30.

Referring again to FIG. 4, an O-ring 34 is disposed between and contacts the retainer arm 30 and a gland 31. The retainer arm 30 and gland 31 do not contact so as to allow the retainer arm 30 with stationary seal ring 24 to move axially along the length of the shaft 21. The O-ring 34 may be any sealing device suitable to an interface along which relative motion is possible. The location of the O-ring 34 between the retainer arm 30 and the gland 31 further seals the inner chamber 48 from the outer chamber 45. In preferred embodiments, the O-ring 34 is placed at the balanced diameter of the stationary seal ring 24 and the retainer arm 30. The retainer arm 30 is secured to the gland 31 via a plurality of pins 33 separately disposed about the sleeve 22.

Each pin 33 extends through the gland 31 and partially extends into the retainer arm 30. The pins 33 prevent rotation of the stationary seal ring 24 and retainer arm 30 that could otherwise occur due to frictional drag forces along the sealing interface 25 between the rotatable seal ring 23 and the stationary seal ring 24.

Referring again to FIG. 4, a plurality of springs 32 are separately disposed about the sleeve 22. A first end of each spring 32 contacts the gland 31 and a second end of each spring 32 partially resides within and contacts the retainer arm 30. The springs 32 are at least partially compressed when assembled between the gland 31 and the retainer arm 30 so as to communicate a force onto the retainer arm 30 in the direction of the seal rings 23, 24. This arrangement ensures the seating force and pressure balance required to maintain the sealing interface 25 between the seal rings 23, 24. The springs 32 are axially energized, that is initially compressed, to permit the retainer arm 30 and the stationary seal ring 24 to move axially so as to maintain the sealing interface 25 when the shaft 21 moves.

Referring again to FIG. 4, the gland 31 abuts and is secured to a seal housing 35 via a plurality of fasteners 41 separately disposed about the sleeve 22. Each fastener 41 extends through the seal housing 35 and partially extends into the gland 31. The fasteners 41 are threaded and engage complementary threads within the gland 31. A sealing ring 38 is provided between the inner diameter of the seal housing 35 and the outer diameter of the sleeve 22 adjacent to the drive collar 39. Exemplary sealing rings 38 include but are not limited to spring-loaded seals, rubberized seals, and lip seals.

Referring again to FIG. 4, setting plates 36 are provided along the seal housing 35 opposite of the interface with the gland 31. The setting plates 36 allow assembly of the sealing elements and related components in cartridge form about the shaft 21. The setting plates 36 also permit an assembler to properly position the stationary seal ring 24 and retainer arm 30 with respect to the rotatable seal ring 23 and to set the initial operating length of the springs 32 for the seating force and pressure balance required to maintain the sealing interface 25 between the seal rings 23, 24. Although one setting plate 36 is shown in FIG. 4, it is understood that two or more setting plates 36 are appropriate for most applications and are positioned about the face of the seal housing 35.

Referring again to FIG. 4, each setting plate 36 overlays a circumferential portion of the sleeve 22. Each setting plate 36 is secured to the seal housing 35 via a fastener 37 which completely traverses a slot 82 along the setting plate 36 and partially traverses the seal housing 35. The fastener 37 engages complementary threads within the seal housing 35. Each setting plate 36 is movable along the slot 82 toward and away from the sleeve 22. Each setting plate 36 engages a groove 53 disposed along the outer surface of the sleeve 22 to support the sealing rings 23, 24, retainer arm 30, gland 31, and seal housing 35 above the sleeve 22 during assembly of the sleeve 22 onto the shaft 21.

Referring again to FIG. 4, the gland 31 contacts and is secured to a casing 42 or other structure within a pump via fasteners or other means understood in the art (not shown). An O-ring 43 is provided along the interface between gland 31 and casing 42 to seal the process side 54 from the atmosphere side 55. The O-ring 43 may be any temperature-resistant sealing element suitable for use within a slurry environment, examples including but not limited to sealing rings and gaskets. The seal rings 23, 24, retainer arm 30, gland 31, and seal housing 35 are properly supported by the casing 42 after the gland 31 is secured to the casing 42. This arrangement allows the fasteners 37 to be loosened and the setting plates 36 retracted from the groove 53 thereby separating the setting plates 36 from the sleeve 22. The fasteners 37 are then retightened to secure the setting plates 36 to the seal housing 35. It is likewise possible that the fasteners 37 and setting plates 36 are removed so as to ensure proper balance by the slurry seal assembly 20 about the shaft 21 after the slurry seal assembly 20 is secured to the casing 42. It is understood that the setting plates 36 must not contact the sleeve 22 during operation of a pump or the like so that the shaft 21, sleeve 22, rotatable seal ring 23, and O-ring 27 are freely rotatable with respect to other components comprising the slurry seal assembly 20. The setting plates 36 may be reseated within the groove 53 and secured to the seal housing 35 via the fasteners 37 when the slurry seal assembly 20 is repaired or replaced in part or whole.

Referring again to FIG. 4, a floating bushing seal assembly 50 is fastened to and extends from the gland 31 in the direction of the process side 54. The floating bushing seal assembly 50 includes an annular bushing arm 57 substantially parallel to the cylindrical section 79. The seal rings 23, 24 are interposed between the bushing arm 57 and the cylindrical section 79. The sealing end of the floating bushing seal assembly 50 is positioned above the radial extension 78 adjacent to the seal rings 23, 24. The seal rings 23, 24 are further interposed between a grease-filled inner chamber 48 and a water-filled outer chamber 45.

Referring again to FIG. 4, the annular outer chamber 45 is generally defined by the floating bushing seal assembly 50, gland 31, retainer arm 30, seal rings 23, 24, and radial extension 78. A fluid inlet channel 44 is provided through the gland 31. The fluid inlet channel 44 communicates at one end with the atmosphere side 55 and at another end with the outer chamber 45. The fluid inlet channel 44 further communicates with a water supply pump (not shown) at the atmosphere side 55 to fill the outer chamber 45 with water. The pump replenishes fluid that otherwise flows from the outer chamber 45 into the process side 54 as described herein. In preferred embodiments, the water pressure is slightly higher than the pressure within the process side 54 so as to resist upstream flow (from the process side 54 to the atmosphere side 55) by the slurry.

Referring again to FIG. 4, the annular inner chamber 48 is generally defined by the cylindrical section 79, radial extension 78, seal rings 23, 24, retainer arm 30, gland 31, seal housing 35, and sealing ring 38. A grease inlet channel 46 and a grease outlet channel 47 are provided through the gland 31. The channels 46, 47 separately communicate at one end with the atmosphere side 55 and at another end with the inner chamber 48. At least the grease inlet channel 46 further communicates with a grease unit (not shown) at the atmosphere side 55 which allows the inner chamber 48 to be filled with a grease or other viscous, water-insoluble material. The grease unit may be either a manually-actuated or a motor-actuated pump or the like. The grease outlet channel 47 permits grease and fluid which traverses the sealing interface 25 to exit the inner chamber 48. In preferred embodiments, the grease pressure is slightly higher than the pressure within the process side 54 so as to resist upstream flow (from the process side 54 to the atmosphere side 55) by the slurry.

Figure 5:
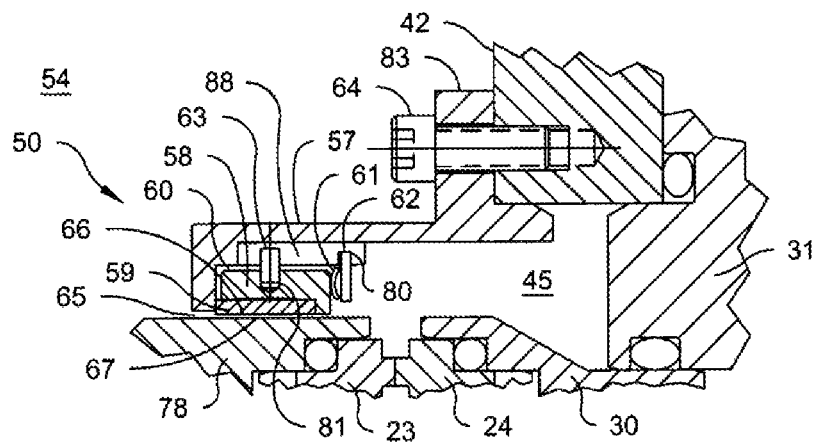
FIG. 5 is an enlarged cross section view illustrating a floating bushing seal assembly including an inner ring, an outer ring, and an annular space at one end of a bushing arm attached to a casing in accordance with an embodiment of the invention.

Referring now to FIGS. 4 and 5, the floating bushing seal assembly 50 includes a ring-shaped bushing arm 57 that extends toward the process side 54. In preferred embodiments, the bushing arm 57 is parallel to the cylindrical section 79 as shown in FIG. 4. The bushing arm 57 may be secured to a component within the slurry seal assembly 20 or the device within which the slurry seal assembly 20 is secured. As shown in FIG. 4, an annular bushing arm 57 may be fixed to and extend from the gland 31. The bushing arm 57 may be machined as part of the gland 31 or welded to the gland 31 or molded onto the gland 31 or mechanically fastened to the gland 31 via a shrink fit. Attachment of the bushing arm 57 to the gland 31 or other component within the slurry seal assembly 20 is advantageous to cartridge forms of the assembly 20 whereby the assembly 20 is assembled onto to a shaft 21 as a complete or nearly complete unit. As shown in FIG. 5, an annular bushing arm 57 may be mechanically fastened to a casing 42 or the like disposed within a pump. The bushing arm 57 may be secured to the casing 42 via a plurality of fasteners 64 disposed about the sleeve 22. Each fastener 64 could completely traverse a flange 83 extending from the bushing arm 57 and partially extend into the casing 42 thereby engaging complementary threads within the casing 42. Attachment of the bushing arm 57 to the casing 42 or the like is advantageous to retrofit forms of the slurry seal assembly 20 requiring assembly of the slurry seal assembly 20 within a pump. In other embodiments, the bushing arm 57 may be press fit onto the casing 42. Regardless of attachment means between bushing arm 57 and casing 42, it may be advantageous to include an O-ring, gasket, or similar sealing element (not shown) along the interface the bushing arm 57 and the casing 42.

Referring again to FIG. 5, an outer ring 58 is disposed about and contacts an inner ring 59 at one end of the bushing arm 57 adjacent to the process side 54. The bushing arm 57 includes a generally L-shaped cross section so as to support one lateral side of and to limit radial movement by the outer and inner rings 58, 59 immediately adjacent to the process side 54. A wave spring 61 or the like, examples including but not limited to compression springs, is provided along a second lateral side of the outer and inner rings 58, 59 opposite of the lateral support provided by the bushing arm 57. The wave spring 61 is secured to the bushing arm 57 via a retaining ring 62 securable to a groove 80 along the inner diameter of the busing arm 57. The wave spring 61 communicates a force onto the outer and inner rings 58, 59 in the direction of the process side 54. This arrangement ensures a compressive force is applied onto both outer and inner rings 58, 59 by the wave spring 61 so that both rings 58, 59 are biased toward the bushing arm 57 along the rotational axis 56. An annular space 60 is provided between the outer diameter of the outer ring 58 and inner diameter of the bushing arm 57.

Referring again to FIG. 5, at least one anti-rotation pin 63 extends from the outer ring 58 in the direction of the bushing arm 57 and partially resides within a hole 81 along the outer diameter of the outer ring 58. The diameter of the hole 81 is slightly smaller than the diameter of the anti-rotation pin 63 requiring each anti-rotation pin 63 to be press fit onto the outer ring 58. The anti-rotation pin 63 should be sufficiently long so as to extend across the annular space 60.

Figure 6:
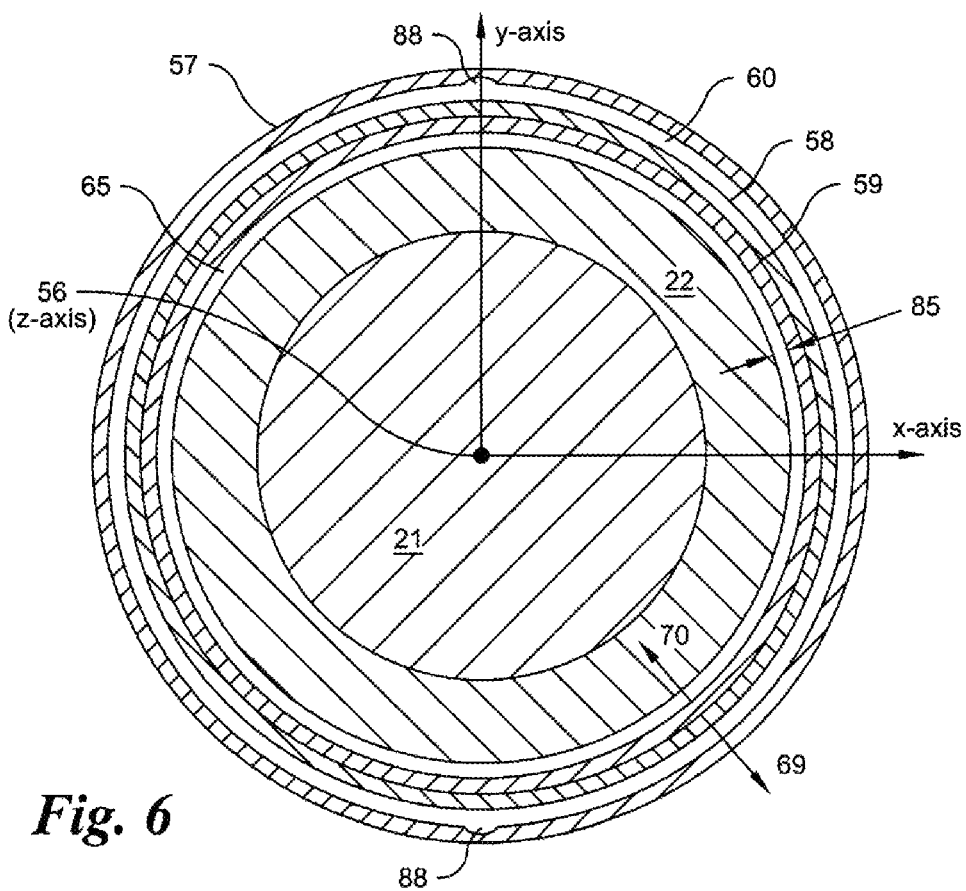
FIG. 6 is a schematic diagram illustrating the plane (x-y axes) wherein an inner ring and an outer ring within a floating bushing seal assembly move radially inward and outward perpendicular to a rotational axis (z-axis) in accordance with an embodiment of the invention.

Referring now to FIGS. 5 and 6, at least one slot 88 partially traverses the inner annular surface of the bushing arm 57. The slot 88 begins adjacent to the outer chamber 45 and extends in the direction of the process side 54. In some embodiments, the slots 88 are parallel to a portion of the radial extension 78, as represented in FIG. 5. In other embodiments, the slots 88 are parallel to a portion of the radial extension 78 and traverse the outer chamber 45, as represented in FIG. 4. The depth and width of each slot 88 should allow a portion of an anti-rotation pin 63 to reside within the slot 88. This arrangement permits assembly of the outer and inner rings 58, 59 within the bushing arm 57 whereby each anti-rotation pin 63 aligns with and is slidable into and along one slot 88. The width of the slot 88 should limit rotation of the anti-rotation pin 63 within the slot 88 so as to minimize relative rotational movement between the bushing arm 57 and the outer and inner rings 58, 59.

Referring again to FIGS. 5 and 6, the inner annular surface 66 along the inner ring 59 and the outer annular surface 67 along the radial extension 78 are separated by a gap 65. The gap 65 provides a pathway between the process side 54 and the outer chamber 45 so that fluid may flow out of the outer chamber 45 in the downstream direction (from the atmosphere side 55 to the process side 54). The distance between the outer annular surface 67 and the inner annular surface 66 generally defines the height 85 of the gap 65. The height 85 represents the average distance between the inner and outer annular surfaces 66, 67 when the floating bushing seal assembly 50 is centered about the radial extension 78. While the outer and inner rings 58, 59 may radially translate with respect to the bushing arm 57, pressure forces within the gap 65 minimize variations in the height 85 about the sleeve 22. In preferred embodiments, the height 85 is minimized so that the velocity and pressure of the fluid within the gap 65 is sufficient to resist upstream flow by material originating within the process side 54. The velocity and pressure conditions required to resist upstream flow are application dependent and based on a variety of factors including, but not limited to, the density, composition and viscosity of the material within the process side 54, the pressure within process side 54, the density, viscosity and composition of fluid within the outer chamber 45, and the pressure of the fluid within the outer chamber 45. In one non-limiting example, a gap 65 with a height 85 of 0.005-inches was sufficient to resist upstream flow when the slurry was bauxite, the pressure within the process side 54 was 190 pounds-per-square-inch, the temperature within the process side 54 was 200 degrees Fahrenheit, the fluid was water, and the pressure of the fluid within the outer chamber 45 was 191 pounds-per-square-inch.

Referring again to FIGS. 5 and 6, the inner ring 59 in preferred embodiments is composed of a hard, temperature resistant, and wear resistant material, examples including, but not limited to, silicon carbide, tungsten carbide, and high-impact polymers. The outer ring 58 is disposed about, contacts, and supports the inner ring 59, thereby functioning as a retainer ring. The outer ring 58 may be composed of a metal, examples including, but not limited to, steel and alloys thereof. The outer ring 58 may be shrink fitted onto the inner ring 59.

Referring again to FIGS. 5 and 6, the thermal expansion of the outer ring 58 should control expansion of the inner ring 59 so that variations in the height 85 are minimized over a range of temperatures within the slurry seal assembly 20. For example, a thermal expansion rate of $2.5 \times 10^{-6}$ inch/inch/degree Fahrenheit was adequate to control a gap 65 with a height 85 of 0.005-inches at an operating temperature of 200 degrees Fahrenheit for an inner ring 59 composed of silicon carbide with an inner diameter of 7.377-inches at room temperature, an outer ring 58 composed of duplex stainless steel with an inner diameter of 7.770-inches at room temperature, and a sleeve 22 composed of duplex stainless steel with a radial extension 78 with an outer diameter of 7.362-inches at room temperature. In preferred embodiments, the coefficients of thermal expansion between the outer ring 58, the radial extension 78, and the shaft 21 are minimized. The combination of thermal properties and shrink-fit construction permits the outer and inner rings 58, 59 to closely match the radial expansion and contraction of the sleeve 22 so that deviations from the design height 85 are minimized, damage to the floating bushing seal assembly 50 and sleeve 22 due to thermal-induced excursions is avoided, and fluid flow is controlled.

Referring again to FIG. 5, the outer annular surface 67 in preferred embodiments is both hard and wear resistant. In some embodiments, the outer diameter of the radial extension 78 may include a thin layer of hard chrome or other suitable plating. In yet other embodiments, the outer surface of the radial extension 78 may include a ceramic layer applied thereto via techniques known within the art.

Referring now to FIG. 6, the sleeve 22 is disposed about and contacts the outer surface of the shaft 21, the outer ring 58 is disposed about and contacts the inner ring 59, and the bushing arm 57 is disposed about the outer ring 58. The outer and inner rings 58, 59 are interposed between and separate from the bushing arm 57 and sleeve 22 so that the annular space 60 is interposed between the bushing arm 57 and the outer ring 58 and so that the gap 65 is interposed between the inner ring 59 and the sleeve 22. The annular space 60 and the gap 65 permit the outer and inner rings 58, 59 to float. The float feature allows outward radial movement 69 and inward radial movement 70 by the outer and inner rings 58, 59 within the X-Y plane perpendicular to the Z-axis or rotational axis 56. The dynamic flow of fluid and windage across the gap 65 may resist inward and outward radial excursions by the outer and inner rings 58, 59 thereby preferring an arrangement whereby the outer and inner rings 58, 59 are centered about the sleeve 22 and/or re-centered after the outer and inner rings 58, 59 are radially displaced off-center.

Referring now to FIGS. 4, 7, 8 and 9, a plurality of slots 52 is provided along the sleeve 22 within the process side 54. The slots 52 are separately disposed along the sleeve face 51 about the circumference of the sleeve 22. Each slot 52 is a depression, flute, or recess whereby a base 86 along the slot 52 is disposed below the sleeve face 51. Each slot 52 is biased toward the outer circumference of the sleeve face 51 so that the open ends of the slot 52 are disposed along the sleeve face 51 and the outer annular surface 67. In some embodiments, the opening along the outer annular surface 67 may extend into the gap 65. The outer circumference of the radial extension 78 may include a chamfer 84 or the like that either does or does not overlay the slots 52.

Referring again to FIGS. 7, 8, and 9, a shoulder 87 is interposed between the sleeve face 51 and the base 86 in preferred embodiments. Although the shoulder 87 is shown perpendicular to the base 86 in FIG. 9, other arrangements are possible whereby the angle between the shoulder 87 and the base 86 is more or less than ninety degrees (90°). In other embodiments, the base 86 and/or the shoulder(s) 87 may include linear and/or curved features. The outermost portion of the shoulder 87 generally defines the shape of the slot 52 along the sleeve face 51. In some embodiments, the slots 52 may include a shape that is elongated or circular as illustrated in FIGS. 7 and 8, respectively; however, other shapes including linear and/or curved features are possible.

The mechanical action by the slots 52 and sealing function by the floating bushing seal assembly 50 cooperate to resist flow of a slurry upstream toward the rotatable and stationary seal rings 23, 24. While several such mechanisms that resist flow by a slurry across a slurry seal assembly 20 are separately described herein, it is understood that such mechanisms may separately or jointly prevent a slurry from entering and/or traversing a gap 65 between a stationary floating bushing seal assembly 50 and a sleeve 22.

Figure 10:
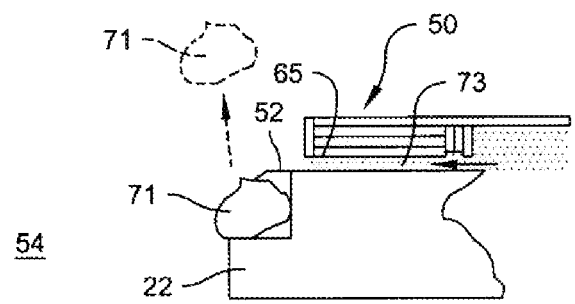
FIG. 10 is a schematic diagram illustrating physical interaction within a process side between a slot along a rotating sleeve and a slurry whereby the slurry is redirected away from a gap between a floating bushing seal assembly and the sleeve in accordance with an embodiment of the invention.
Figure 11:
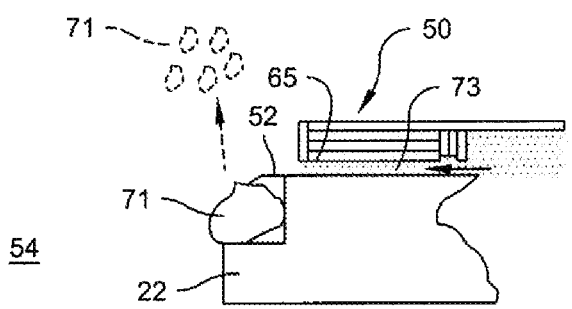
FIG. 11 is a schematic diagram illustrating physical interaction within a process side between a slot along a rotating sleeve and a slurry whereby the slurry is redirected as several smaller masses away from a gap between a floating bushing seal assembly and the sleeve in accordance with an embodiment of the invention.

Referring now to FIGS. 10 and 11, the slots 52 rotate with the sleeve 22 relative to the floating bushing seal assembly 50. A fluid 73 traverses the gap 65 in a direction away from the seal rings 23, 24. The slots 52 may physically interact with a slurry mass (not shown) residing within the process side 54. This interaction may tear, chop, or otherwise separate portions of the slurry 71 from the slurry mass. A portion of the slurry 71 is then captured by a slot 52 and rotates with the sleeve 22. Centrifugal forces are communicated to the slurry 71 by the sleeve 22 causing the slurry 71 to separate from the slot 52 along a vector directed outward in a substantially radial direction and away from the floating bushing seal assembly 50. The result is a redirection of the slurry 71 away from the gap 65. The slurry 71 may be redirected either as a single mass as illustrated in FIG. 10 or as two or more smaller masses when the slurry 71 is further dispersed radially outward as illustrated in FIG. 11.

Figure 7:
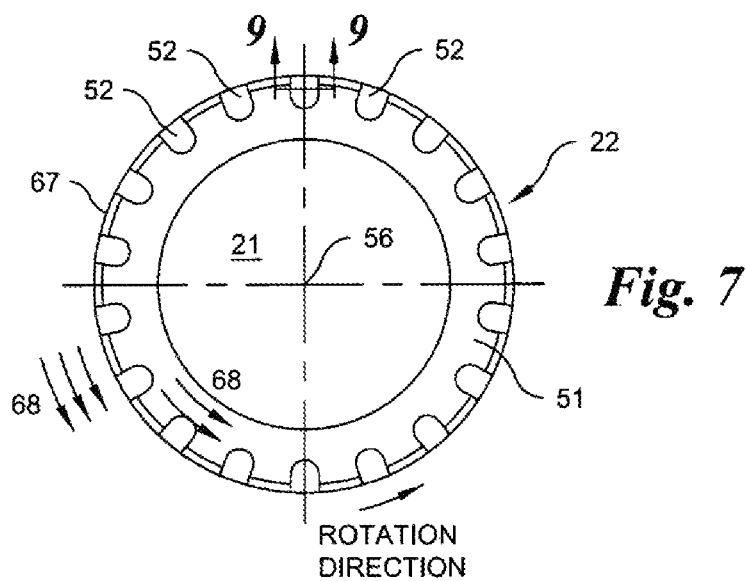
FIG. 7 is a plan view illustrating a plurality of elongated slots disposed along a sleeve face in accordance with an embodiment of the invention.
Figure 8:
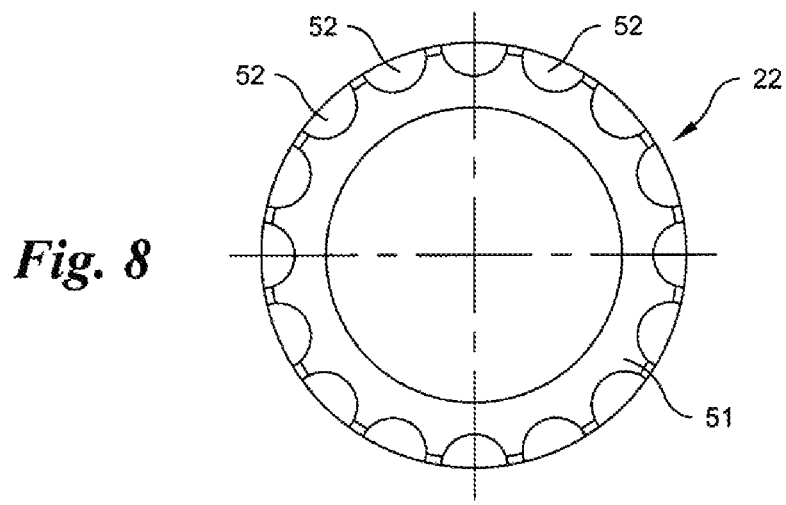
FIG. 8 is a plan view illustrating a plurality of semi-circular slots disposed along a sleeve face in accordance with an embodiment of the invention.
Figure 9:
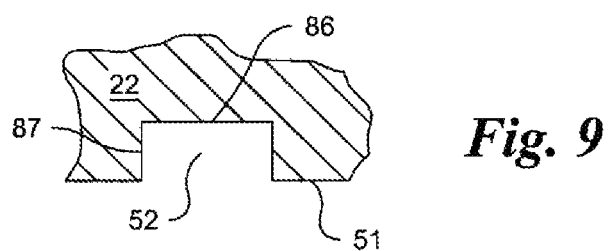
FIG. 9 is an enlarged cross section view illustrating a shoulder and a base within a slot in accordance with an embodiment of the invention.
Figure 12:
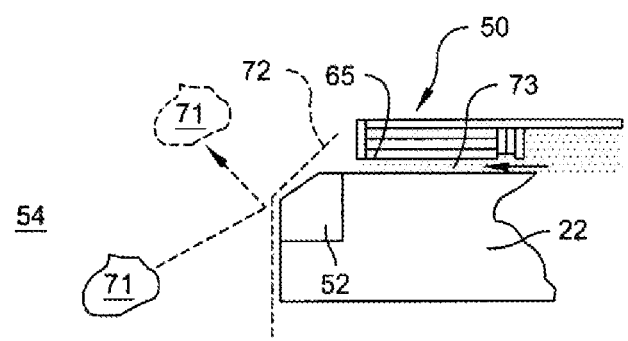
FIG. 12 is a schematic diagram illustrating interaction within a process side between a slurry and a barrier formed by windage adjacent to slots along a sleeve whereby the slurry is redirected away from a gap between a floating bushing seal assembly and the sleeve in accordance with an embodiment of the invention.

Referring now to FIGS. 7 and 12, the slots 52 rotate with the sleeve 22 relative to the floating bushing seal assembly 50. A fluid 73 traverses the gap 65 in a direction away from the seal rings 23, 24. The slots 52 may interact with one or more fluids within the process side 54. The interaction may produce a windage 68 in the rotational direction adjacent to the sleeve face 51 and/or the outer annular surface 67, as presented in FIG. 7. For example, the windage 68 may be characterized as a circular flow of air and/or water within a flow field along and/or near the outer surface(s) of the sleeve 22. Depending on conditions within the flow field, the windage 68 may form a barrier 72 that resists upstream flow by the slurry 71, thereby redirecting the slurry 71 away from the floating bushing seal assembly 50 and the gap 65 therein.

Figure 13:
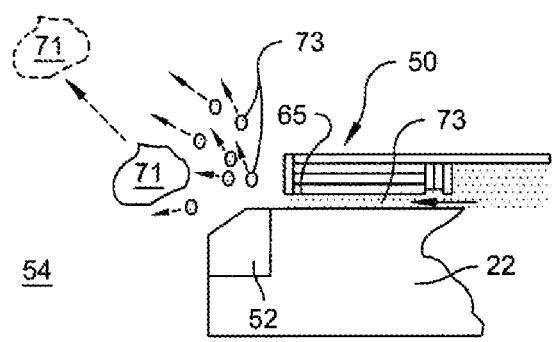
FIG. 13 is a schematic diagram illustrating interaction within a process side between a fluid exiting a gap between a floating bushing seal assembly and a sleeve and subsequent interaction between the fluid and a slurry whereby the slurry is redirected away from the gap in accordance with an embodiment of the invention.

Referring now to FIG. 13, the slots 52 rotate with the sleeve 22 relative to the floating bushing seal assembly 50. A fluid 73 traverses the gap 65 in a direction away from the seal rings 23, 24. Flow conditions within the fluid 73 generally resist upstream flow of the slurry 71 along the gap 65. Rotation of the slots 52 may allow the slots 52 to interact with the fluid 73 and alter the flow characteristics thereof. In one example, the slots 52 may interact with the fluid 73 either physically or via windage 68 so as to increase the velocity of the fluid 73 within the gap 65 and/or the process side 54. In another example, the slots 52 may interact with the fluid 73 either physically or via windage 68 so as to dispense the fluid 73 more widely within the process side 54 than otherwise permitted by the gap 65 alone. The accelerated and/or more widely dispersed fluid 73 then may interact with the slurry 71 within the gap 65 and/or the process side 54 to redirect the slurry 71 away from the floating bushing seal assembly 50 and the gap 65 therein.

Referring again to FIG. 4, the shaft 21 rotates the sleeve 22 attached thereto which in turn rotates the rotatable seal ring 23. The rotatable seal ring 23 is disposed adjacent to the stationary seal ring 24 and arranged to form the sealing interface 25 therebetween. The stationary seal ring 24 is not rotatable as it is attached to one or more non-rotatable components. The fluid originally residing within the outer chamber 45 is communicated into and across the gap 65 interposed between the floating bushing seal assembly 50 and a portion of the sleeve 22. The shaft 21 also rotates the plurality of slots 52 disposed along a portion of the sleeve 22 within the process side 54. The slots 52 and the floating bushing seal assembly 50 functionally cooperate to resist flow by the slurry into and across the gap 65, thereby preventing the slurry from entering the outer chamber 45 upstream and from traversing the sealing interface 25 between the rotatable seal ring 23 and stationary seal ring 24. The fluid generally resists the slurry from the process side 54 from traversing the gap 65 toward the atmosphere side 55. The slots 52 interact with the fluid to accelerate the fluid either within or during and/or after entering the process side 54 and/or to disperse the fluid after entering the process side 54 so as to redirect slurry away from the gap 65. A higher flow velocity across the gap 65 is more likely to break up the slurry as it traverses the gap 65. The slots 52 may physically contact the slurry and change the flow direction of the slurry so that it flows away from the gap 65. The slots 52 may produce windage 68 that changes the flow direction of the slurry so that it flows away from the gap 65.

It is understood that the slots 52 may simultaneously produce two or more of the functionalities described herein to resist flow in the direction of an atmosphere side 55 by material originating in a process side 54. For example, one or more such slots 52 may physically interact with a slurry, one or more such slots 52 may generate windage 68, and one or more such slots 52 interact with a fluid.

The invention may be used within a variety of applications wherein a fluid is movable between an inlet and an outlet. One specific non-limiting example is a slurry pump wherein a seal assembly is required about a rotatable shaft to prevent leakage between a process side and an atmosphere side and the seal assembly must resist premature wear of sealing components by abrasive particles.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A slurry seal assembly for use about a rotatable shaft between a process side and an atmosphere side comprising:
   (a) a sleeve disposed about, contacting, and rotatable with said rotatable shaft;
   (b) a rotatable seal ring contacting and rotatable with said sleeve;
   (c) a stationary seal ring arranged to form a sealing interface with said rotatable seal ring; and
   (d) a floating bushing seal assembly including a bushing arm, an inner ring, an outer ring, an annular space, and a gap, said outer ring disposed about and contacting said inner ring, said annular space disposed between said outer ring and said bushing arm, said floating bushing seal assembly disposed about said sleeve with said gap disposed between said inner ring and said sleeve, said gap and said annular space permit radial translation of said inner ring and said outer ring within said floating bushing seal assembly between said sleeve and said bushing arm.

2. The slurry seal assembly of claim 1, further comprising:
   (e) a plurality of slots disposed along a front face of said sleeve at said process side and adjacent to said floating bushing seal assembly, each said slot disposed along both said front face of said sleeve and an outer annular surface of said sleeve, said plurality of slots rotatable with said sleeve.

3. The slurry seal assembly of claim 2, wherein said plurality of slots and said inner ring cooperate to resist flow of a slurry along said gap in direction of said rotatable seal ring and said stationary seal ring.

4. The slurry seal assembly of claim 3, wherein said plurality of slots extends along said outer annular surface into said gap.

5. The slurry seal assembly of claim 3, wherein a chamfer overlays said plurality of slots.

6. The slurry seal assembly of claim 3, wherein a windage disposed adjacent to said outer annular surface as said plurality of slots rotates, said windage intersects said gap.

7. The slurry seal assembly of claim 3, wherein at least one of said plurality of slots interacts with said slurry to redirect said slurry away from said gap.

8. The slurry seal assembly of claim 3, wherein at least one of said plurality of slots produces a windage to redirect said slurry away from said gap.

9. The slurry seal assembly of claim 3, wherein at least one of said plurality of slots interacts with a fluid to redirect said slurry away from said gap.

10. The slurry seal assembly of claim 1, further comprising:
    (e) an anti-rotation pin which extends from said outer ring and engages a slot along said bushing arm.

11. The slurry seal assembly of claim 1, wherein a pump has said slurry seal assembly according to claim 1.

12. The slurry seal assembly of claim 1, wherein a fluid traverses said gap in direction of said process side.

13. The slurry seal assembly of claim 12, wherein said fluid prevents a slurry from traversing said gap in direction of said atmosphere side.

14. A method of sealing a process side from an atmosphere side within a pump comprising the steps of:
    (a) rotating a rotatable seal ring and a sleeve with respect to a stationary seal ring, said rotatable seal ring and said stationary seal ring define a sealing interface therebetween, said rotatable seal ring contacts said sleeve; and
    (b) communicating a fluid along a gap between an inner ring of a floating bushing seal assembly and said sleeve, an outer ring of said floating bushing seal assembly disposed about and contacting said inner ring, an annular space disposed between said outer ring and a bushing arm of said floating bushing seal assembly, said gap and said annular space permit radial movement of said inner ring and said outer ring between said sleeve and said bushing arm.

15. The method of claim 14, wherein a plurality of slots disposed along a front face of said sleeve within said process side, said plurality of slots rotatable with said sleeve, said sleeve disposed about and contacts a rotatable shaft, each said slot disposed along both said front face of said sleeve and an outer annular surface of said sleeve, said inner ring and said gap disposed about said outer annular surface of said sleeve.

16. The method of claim 15, wherein said plurality of slots and said floating bushing seal assembly cooperate to resist flow of a slurry in direction of said rotatable seal ring and said stationary seal ring.

17. The method of claim 15, wherein said communicating step and said rotating step prevent a slurry originating from said process side from traversing said gap toward said atmosphere side.

18. The method of claim 15, wherein said communicating step and said rotating step cause said fluid and said plurality of slots to interact so as to redirect a slurry away from said gap.

19. The method of claim 15, wherein said communicating step and said rotating step cause said plurality of slots to physically contact a slurry so as to redirect said slurry away from said gap.

20. The method of claim 15, wherein said rotating step causes a windage about said plurality of slots which redirects a slurry away from said gap.

21. The method of claim 15, wherein said communicating step and said rotating step cause said fluid to be redirected after said fluid enters said process side.

22. The method of claim 21, wherein said fluid interacts with a slurry so as to redirect said fluid away from said gap.

23. The method of claim 15, wherein said rotating step causes said plurality of slots to physically interact with and disperse a slurry.

24. The method of claim 15, wherein said communicating step and said rotating step accelerate said fluid via said plurality of slots after said fluid enters said process side.

25. The method of claim 15, wherein said communicating step and said rotating step accelerate said fluid via said plurality of slots as said fluid traverses said gap.

26. The method of claim 15, wherein said communicating step and said rotating step disperse said fluid via said plurality of slots after said fluid enters said process side.

27. The method of claim 15, wherein at least one of said plurality of slots interacts with said fluid to redirect a slurry away from said gap.

28. The method of claim 15, wherein at least one of said plurality of slots physically contacts a slurry to redirect said slurry away from said gap.

29. The method of claim 15, wherein at least one of said plurality of slots produces windage to redirect a slurry away from said gap.

30. The method of claim 15, wherein said fluid is redirected via at least one of said plurality of slots after said fluid enters said process side.

31. The method of claim 30, wherein said fluid interacts with a slurry to redirect said slurry away from said gap.

32. The method of claim 15, wherein at least one of said plurality of slots physically interacts with and disperses a slurry.

33. The method of claim 15, wherein said fluid is accelerated via at least one of said plurality of slots after said fluid enters said process side.

34. The method of claim 15, wherein said fluid is accelerated via at least one of said plurality of slots as said fluid traverses said gap.

35. The method of claim 15, wherein said fluid is dispersed via at least one of said plurality of slots after said fluid enters said process side.

36. The method of claim 14, wherein said fluid prevents a slurry originating from said process side from traversing said gap toward said atmosphere side.

37. The method of claim 14, wherein a slurry is redirected away from said gap.

* * * * *